(12) United States Patent
Duchateau et al.

(10) Patent No.: US 11,209,023 B2
(45) Date of Patent: Dec. 28, 2021

(54) GAS COMPRESSOR WITH REDUCED ENERGY LOSS

(71) Applicant: Carnot Compression Inc., Reno, NV (US)

(72) Inventors: Christophe Duchateau, Reno, NV (US); Christopher David Finley, Reno, NV (US); Danil Hans Shillinger, Nevada City, CA (US)

(73) Assignee: CARNOT COMPRESSION INC., Reno, NV (US)

( * ) Notice: Subject to any disclaimer, the term of this patent is extended or adjusted under 35 U.S.C. 154(b) by 36 days.

(21) Appl. No.: 16/878,512

(22) Filed: May 19, 2020

(65) Prior Publication Data

US 2020/0277970 A1 Sep. 3, 2020

Related U.S. Application Data

(63) Continuation-in-part of application No. 16/418,535, filed on May 21, 2019, now Pat. No. 10,920,793.
(Continued)

(51) Int. Cl.
*F04D 31/00* (2006.01)
*F04F 5/06* (2006.01)
(Continued)

(52) U.S. Cl.
CPC ............ *F04F 5/06* (2013.01); *F04D 17/10* (2013.01); *F04D 17/18* (2013.01); *F04D 25/045* (2013.01);
(Continued)

(58) Field of Classification Search
CPC .... F04F 5/06; F04F 5/42; F04D 17/18; F04D 25/045; F04D 29/2222; F04D 29/2238;
(Continued)

(56) References Cited

U.S. PATENT DOCUMENTS

| 892,772 A | 7/1908 | Taylor |
| 1,101,929 A | 6/1914 | Hayes |

(Continued)

FOREIGN PATENT DOCUMENTS

| CN | 1174594 A | 2/1998 |
| CN | 102444579 A | 5/2012 |

(Continued)

OTHER PUBLICATIONS

U.S. Appl. No. 14/280,780, filed May 19, 2014, Cherry et al.
(Continued)

*Primary Examiner* — Ninh H. Nguyen
(74) *Attorney, Agent, or Firm* — BakerHostetler

(57) ABSTRACT

A gas compressor comprising a drum affixed to a rotating shaft, the drum including a plurality of compression channels between a common pressure zone and an interior surface of the drum distal to an axis of rotation. A static vane return assembly adjacent the compression channels includes vanes extending from an inlet at an outer circumference to the common pressure zone and directing gas into the common pressure zone, either through the vanes or via separate channels or ducts. Fluid inside the rotating drum forms an annular lake that is drawn through the vanes and into the common pressure zone. Fluid is then forced into the compression channels where gas in the fluid is compressed as it travels from the common pressure zone toward the interior surface. The pressurized gas is separated from the liquid prior to leaving the compression channel assembly while the liquid is returned to the lake.

27 Claims, 9 Drawing Sheets

Related U.S. Application Data which is a continuation of application No. 15/429,710, filed on Feb. 10, 2017, now Pat. No. 10,359,055.

(60) Provisional application No. 62/850,484, filed on May 20, 2019.

(51) Int. Cl.

| F04D 17/18 | (2006.01) |
|---|---|
| F04D 17/10 | (2006.01) |
| F04D 25/04 | (2006.01) |
| F04D 29/22 | (2006.01) |
| F04F 5/42 | (2006.01) |
| H02K 7/18 | (2006.01) |
| F04D 29/24 | (2006.01) |
| F04D 29/44 | (2006.01) |
| F04D 29/30 | (2006.01) |
| F01D 5/04 | (2006.01) |

(52) U.S. Cl.
CPC ....... *F04D 29/2222* (2013.01); *F04D 29/242* (2013.01); *F04D 29/30* (2013.01); *F04D 29/441* (2013.01); *F04D 29/445* (2013.01); *F04D 31/00* (2013.01); *F04F 5/42* (2013.01); *H02K 7/1823* (2013.01); *F01D 5/048* (2013.01); *F05D 2210/132* (2013.01); *F05D 2220/62* (2013.01); *F05D 2260/601* (2013.01)

(58) Field of Classification Search
CPC ...... F04D 29/242; F04D 29/284; F04D 29/30; F04D 29/441; F04D 29/445; F04D 31/00; F05D 2210/132; F05D 2220/62; F05D 2260/601

See application file for complete search history.

(56) References Cited

U.S. PATENT DOCUMENTS

| 1,144,865 | A | | 6/1915 | Rees |
| 1,457,536 | A | | 6/1923 | Maclean |
| 1,769,260 | A | | 7/1930 | Hughes |
| 1,864,640 | A | | 6/1932 | Dalrymple |
| 1,994,450 | A | | 3/1935 | Carpenter |
| 2,025,037 | A | | 12/1935 | Bergamann |
| 2,076,586 | A | | 4/1937 | Noble |
| 2,118,371 | A | | 5/1938 | Bergmann |
| 2,230,183 | A | | 1/1941 | Ford |
| 2,241,460 | A | * | 5/1941 | Huntley ............ F04D 13/04 417/71 |
| 2,260,600 | A | | 10/1941 | Boeckeler |
| 3,221,659 | A | | 12/1965 | Adams |
| 3,517,229 | A | | 6/1970 | Bidard |
| 3,559,419 | A | | 2/1971 | Kantor |
| 3,584,878 | A | | 6/1971 | Saburo |
| 3,584,978 | A | | 6/1971 | Shimoi |
| 3,650,636 | A | | 3/1972 | Eskeli |
| 3,761,195 | A | | 9/1973 | Eskeli |
| 4,027,993 | A | | 6/1977 | Wolff |
| 4,198,218 | A | * | 4/1980 | Erickson ............ B01D 45/08 55/317 |
| 4,362,473 | A | | 12/1982 | Zeilon |
| 4,439,200 | A | | 3/1984 | Meyer et al. |
| 4,626,176 | A | | 12/1986 | Cole |
| 5,011,371 | A | | 4/1991 | Goltemoller |
| 5,154,583 | A | | 10/1992 | Althaus et al. |
| 5,733,253 | A | | 3/1998 | Headley |
| 6,042,346 | A | | 3/2000 | Doi |
| 6,276,140 | B1 | | 8/2001 | Keller et al. |
| 6,565,315 | B1 | | 5/2003 | Bertels et al. |
| 6,713,028 | B1 | | 3/2004 | Oklejas, Jr. |
| 6,723,205 | B1 | | 4/2004 | Meinander |
| 7,905,360 | B2 | | 3/2011 | Della Casa |
| 8,966,955 | B2 | * | 3/2015 | Henderson ......... B01D 19/0063 73/19.09 |
| 9,618,013 | B2 | | 4/2017 | Cherry et al. |
| 9,919,243 | B2 | | 3/2018 | Cherry et al. |
| 2003/0106302 | A1 | | 6/2003 | Ray |
| 2004/0101414 | A1 | | 5/2004 | Gharib et al. |
| 2004/0197195 | A1 | | 10/2004 | Ogolla et al. |
| 2005/0047270 | A1 | | 3/2005 | Wood et al. |
| 2005/0175449 | A1 | | 8/2005 | Yonehara |
| 2006/0059904 | A1 | | 3/2006 | Shevket |
| 2010/0329891 | A1 | | 12/2010 | Fong et al. |
| 2011/0030359 | A1 | | 2/2011 | Fong et al. |
| 2011/0115223 | A1 | | 5/2011 | Stahlkopf et al. |
| 2015/0023807 | A1 | | 1/2015 | Cherry et al. |
| 2015/0322763 | A1 | | 11/2015 | Bjorge et al. |
| 2016/0102673 | A1 | | 4/2016 | Cherry et al. |
| 2018/0231029 | A1 | | 8/2018 | Cherry et al. |

FOREIGN PATENT DOCUMENTS

| CN | 103733003 A | 4/2014 |
|---|---|---|
| CN | 102655925 B | 1/2015 |
| CN | 105555413 A | 5/2016 |
| DE | 1106028 B | 5/1961 |
| DE | 2356013 A1 | 5/1975 |
| EP | 0096713 A1 | 12/1983 |
| FR | 2248731 A6 | 5/1975 |
| FR | 2589957 A1 | 5/1987 |
| JP | 2016-531734 A | 10/2016 |
| WO | WO 1983/002134 A1 | 6/1983 |
| WO | WO 1987/003051 A1 | 5/1987 |

OTHER PUBLICATIONS

U.S. Appl. No. 62/222,261, filed Sep. 23, 2015, Cherry et al.
Turbines by J.B. Calvert, Feb. 11, 2010 "Turbines" https://mysite.du.edu/jcalvert/tech/fluids/turbine.htm (14 pages).
"Variable Speed Fluid Couplings Driving Centrifugal Compressors and Other Centrifugal Machinery" by Gunther H. Peikert, Houston, Texas (7 pages).
"A Fundamentally New Approach to Air-Cooled Heat Exchangers" by Jeffrey P. Koplow, Jan. 2010, Sandia National Laboratories (48 pages).
Patent Cooperation Treaty International Search Report, PCT/US15/55427, dated Sep. 1, 2016.
European Supplementary Examination Report, PCT/US2014045853, dated Jun. 23, 2016.
Notification of Transmittal of the International Search Report PCT/US/2015/055427, dated Feb. 2, 2016.
PCT Notification of Transmittal of International Preliminary Report on Patentability, PCT/US14/45853, dated Apr. 10, 2015.
Phasor Analysis of Linear Mechanical Systems and Linear Differential Equations ME 104, PRof. B. Paden.
EA3: Systems Dynamics, V1.7 Weakly-Coupled Oscillators, Sridhar Krishnaswamy.
A Guide to Mechanical Impedance and Strutctural Response Techniques, Bruel & Kjaer.
International Patent Application No. PCT/US2018/014399; Int'l Written Opinion and the Search Report; dated Mar. 26, 2018; 14 pages.
International Patent Application No. PCT/US2018/014399; Int'l Preliminary Report on Patentability; dated Apr. 3, 2019; 31 pages.
European Patent Application No. 18751919.4; Extended Search Report; dated Oct. 22, 2020; 5 pages.
International Patent Application No. PCT/US2020/033877; Int'l Search Report and the Written Opinion; dated Aug. 17, 2020; 13 pages.

\* cited by examiner

⇒ Low Pressure Gas
⇒ Liquid
⇒ Gas/Liquid Emulsion
⇒ Make-up Liquid
⇒ Pressured Gas

GAS COMPRESSOR WITH REDUCED ENERGY LOSS

CROSS REFERENCE TO RELATED APPLICATIONS

This application is a non-provisional application taking priority from U.S. Provisional Patent Application No. 62/850,484, filed May 20, 2019, entitled "Gas compressor with Reduced Energy Loss.".

This application is a continuation-in-part of U.S. patent application Ser. No. 16/418,535, filed May 21, 2019, entitled "Energy Recovery-Recycling Turbine Integrated with a Capillary Tube Gas Compressor," which is a continuation of U.S. patent application Ser. No. 15/429,710, filed Feb. 10, 2017, entitled "Energy Recovery-Recycling Turbine Integrated with a Capillary Tube Gas Compressor," now U.S. Pat. No. 10,359,055.

TECHNICAL FIELD

Gas compression systems and, more particularly, internal recirculating centrifugal gas compression systems.

BACKGROUND

In a centrifugal gas compression system, liquid and gas are moved from an inner area to an outer area of a rotating drum. As the liquid and gas move in this manner the gas is compressed and separated from the liquid as it reaches the outer area. Some systems recirculate the liquid from the outer area to the inner area of the system. When the liquid is recirculated externally, meaning outside of the rotating drum of the system there is very little to no energy recovered from the energy input to operate the system. When liquid is recirculated within the drum, such as through a rotating turbine, energy can be recirculated as well, but that energy is recirculated external to the drum. To recover this energy and recirculate it to the drive of the compressor, some type of electrical or mechanical power transmission system is required. It would therefore be desirable to recirculate both liquid and energy without requiring a power transmission system.

The channels through which liquid and gas are moved from the inner area to the outer area are generally tubular. Small capillary tubes may help to force entrained bubbles of gas to be compressed between plugs of liquid. Valves within the tubes or tapered transitions along the tubes may help to prevent gas from leaking back toward the inner area. Capillary tubes, with or without flow restrictions, may be more difficult and costlier to manufacture and present increased energy losses than larger diameter tubes or channels.

SUMMARY

A gas compressor is disclosed comprising a substantially hollow cylindrical drum having one end affixed to a shaft configured to rotate the drum. The drum includes a compression channel assembly including a plurality of compression channels extending from an opening at a common pressure zone toward an interior surface of the drum distal to an axis of rotation. A static vane return (SVR) positioned adjacent the compression channel assembly has an outlet to the common pressure zone and one or more vanes extending from an inlet at an outer circumference of the SVR, which does not rotate with the drum. A ducted spacer block positioned adjacent the SVR may form one or more channels configured to direct gas into the SVR. Rotation of the drum causes fluid inside the drum to form an annular lake. Fluid is drawn from the lake through the vanes and into the common pressure zone where the fluid is forced into the opening of the compression channels, wherein gas in the fluid within each compression channel is compressed as it travels from the common pressure zone toward the interior surface. The pressurized gas is separated from liquid prior to leaving the compression channel assembly. The liquid is returned to the lake.

BRIEF DESCRIPTION OF THE DRAWINGS

The drawings are provided to illustrate example embodiments described herein and are not intended to limit the scope of the disclosure.

DETAILED DESCRIPTION OF ILLUSTRATIVE EMBODIMENTS

Devices, systems and methods are described herein for compressing gas through centrifugal action of a shaft driven compressor drum containing a liquid and a gas. In an energy recovery system for a centrifugal gas compressor that includes a rotating turbine, there may be high liquid pressure at the inlet, but the pressure may drop as the liquid moves toward the outlet, where a velocity of the liquid may match the speed of the compressor drum. As a result, the system may be optimized for power recovery from torque applied to a shaft of the turbine, which may then be transferred to a power transmission system and fed back to the drive for the compressor drum.

Figure 1:
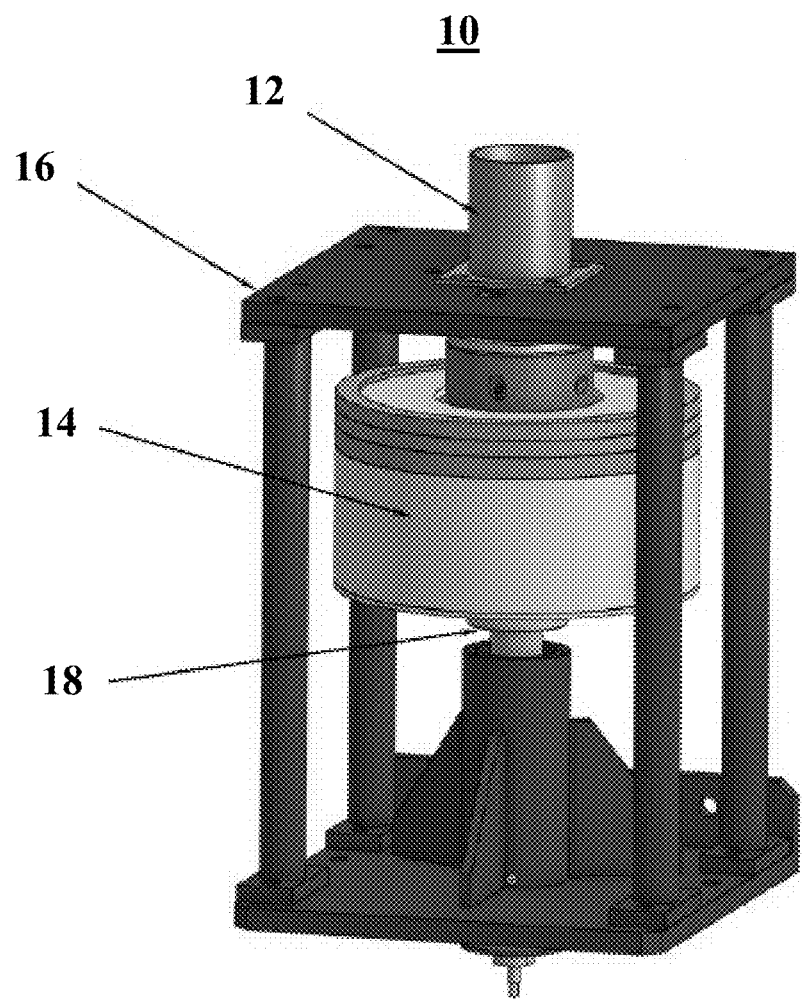
FIG. 1 is a perspective view of a compressor assembly in accordance with an embodiment.

A different type of energy recovery system for a centrifugal compressor 10 is disclosed herein with reference to the Figures. FIG. 1 illustrates the exterior of compressor 10, which includes a static vane return ("SVR") assembly 12 in place of a rotating turbine assembly. In the disclosed system, fluid pressure may be lower at the inlet to the SVR assembly 12 and remain that way as the fluid moves toward the outlet of the SVR assembly, and the velocity of the fluid may initially correspond to the rotation speed of the drum of the compressor and a radial position of an inlet of the SVR assembly 12. This type of system may be optimized for fluid momentum conservation, with energy being returned directly to the compressor drum 14 without the need for any type of additional power transfer system, which may result in reduced energy consumption. As the compressor 10 with the SVR assembly 12 has fewer moving parts than a compressor with a rotating turbine system, it may also be easier and less expensive to manufacture.

The SVR assembly 12 may be supported by a cage assembly 16. The rotating compressor drum 14 may be turned by a shaft assembly 18. A drive system (not shown) may provide power to the shaft assembly 18. Before power is applied to the shaft assembly 18, the compressor drum 14 may be filled approximately halfway with a fluid such as a liquid, such as water or a petrochemical, or a liquid and gas. The compressor drum 14 and the contained fluid may then be rotated by the drive and lower shaft assembly 18 until the fluid is forced against the interior wall of the compressor drum 14 by centrifugal forces, forming an annular lake over the interior wall.

Figure 2:
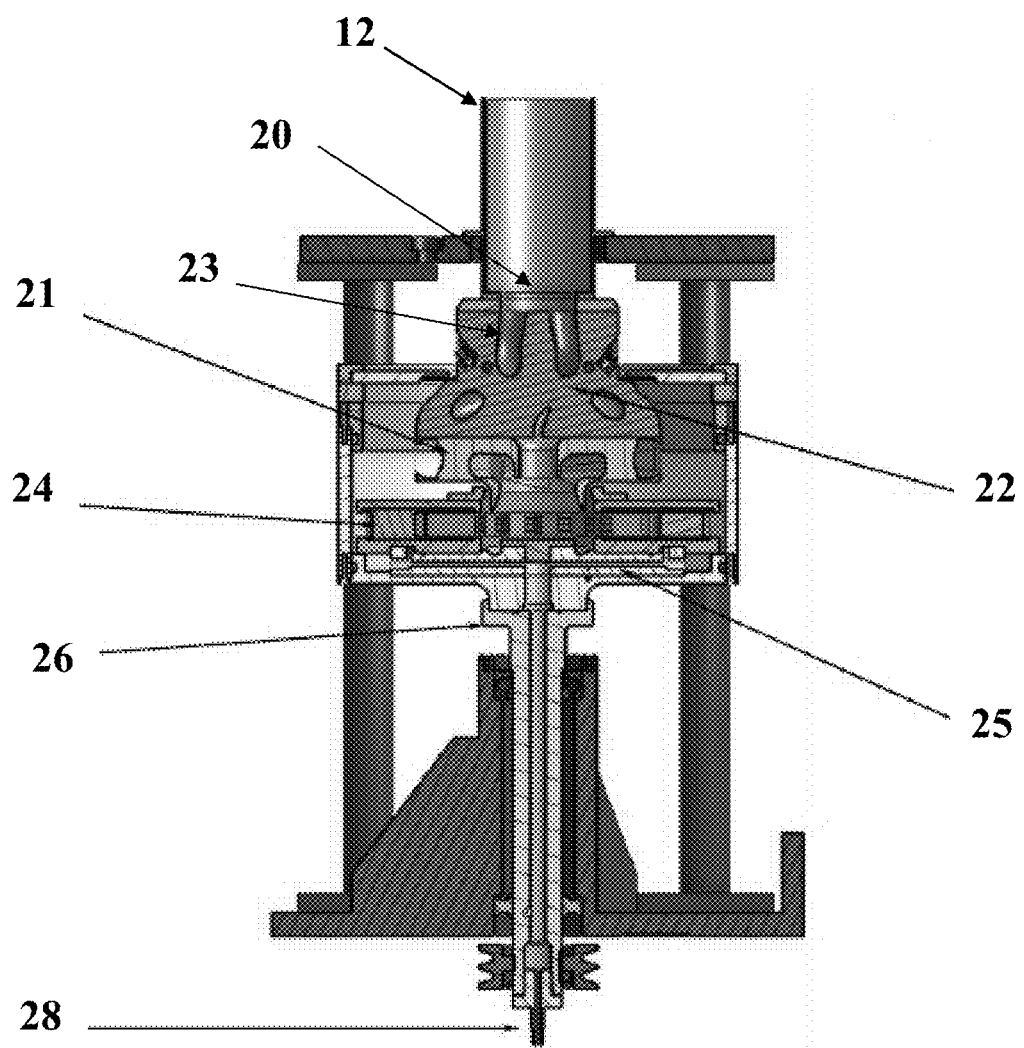
FIG. 2 is a side cross-sectional view of the compressor assembly of FIG. 1.

FIG. 2 illustrates an embodiment of at least a portion of the interior of the compressor 10. The SVR assembly 12 includes the mounting column 20 and the static vane return (SVR) 21. In an embodiment, rotation of the compressor drum 14 may cause gas external to the compressor drum 14 to be pulled into the compressor 10 through an opening, such as in the top or upper portion of the compressor 10, and directly into the SVR 21. Although reference is made herein to the compressor 10 being vertically aligned, wherein the first end of the compressor 10 or one of its components is essentially the top or upper portion of that component and the second end is the opposite end, i.e., the bottom or lower portion of that component, it will be appreciated that the compressor 10 may operate in a horizontal or other alignment, such that the first end is one side and the second end is an opposite side.

In an embodiment the SVR assembly may also include the ducted spacer block 22. The ducted spacer block 22 may have a first end that extends through an opening in a first end of the compressor drum 14 and is connected to the mounting column 20. A second (i.e., opposite) end of the ducted spacer block 22 may be connected to a first end of the SVR 21. Gas may enter the mounting column 20 and be pulled into the compressor through gas inlet channels 23 or gas may be pulled around a shield ring positioned around the ducted spacer block 22 (shown as shield ring 46 in FIG. 4) and into the SVR inlets 52A.

Figure 6:
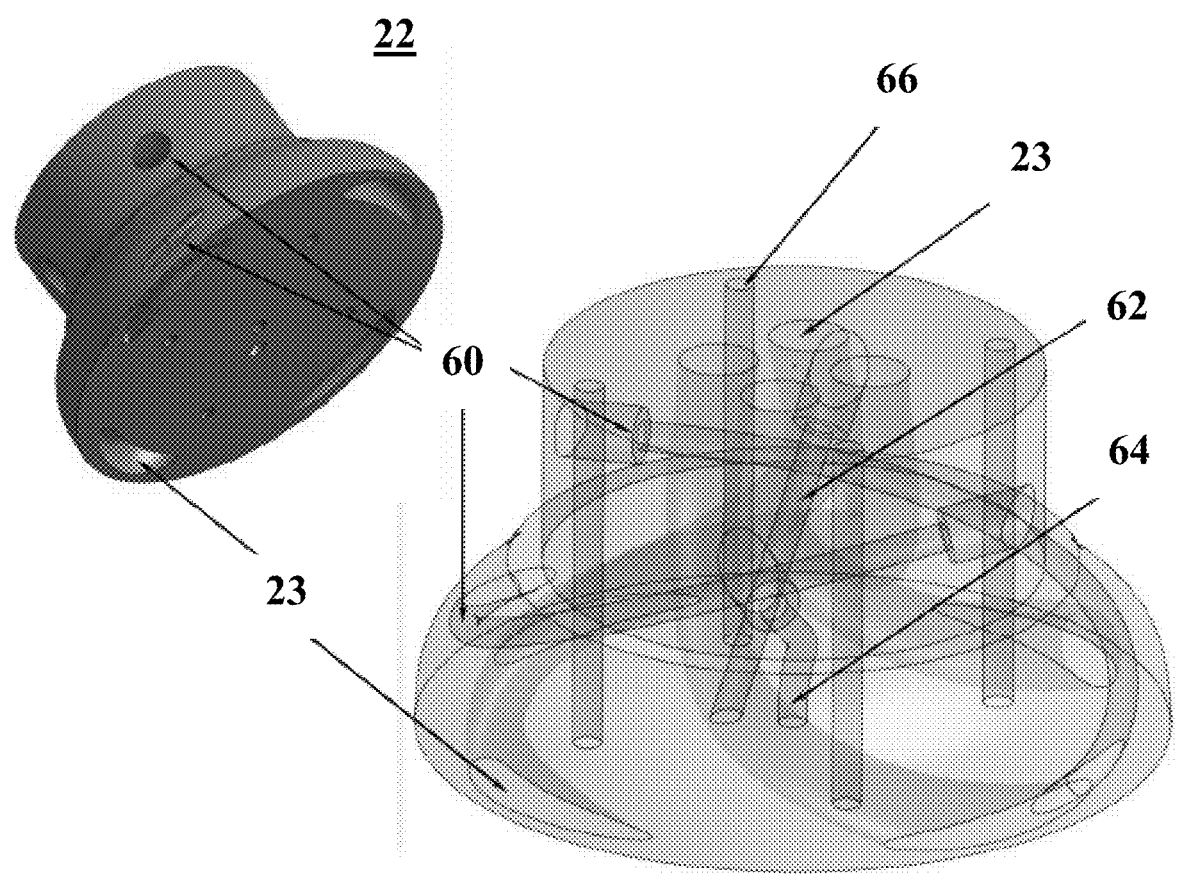
FIG. 6 includes perspective and translucent illustrations of the gas inlet duct body of the static vane return assembly of FIG. 4.

In an embodiment, and as more fully illustrated in FIG. 6, there may be four gas inlet channels 23 that start where the first end of the ducted spacer block 22 connects to the mounting column 20 and that may be configured to route incoming gas through the mounting column 20 into the compressor drum 14, although any number of channels may be used as appropriate for a desired gas flow and the routing flow may be different. The gas inlet channels 23 may not be needed when gas is pulled around the shield ring.

A compression channel assembly 24 may be positioned inside the compressor drum 14 such that the first end of the compression channel assembly 24 is next to but separate and apart from the second end of the SVR 21. A gas harvest plate 25 may be positioned at the second end of the compression channel assembly 24. The gas harvest plate 25 may be connected to first end of the shaft 26. The second end of the shaft 26 may be connected to a gas harvest nipple 28.

Figure 3:
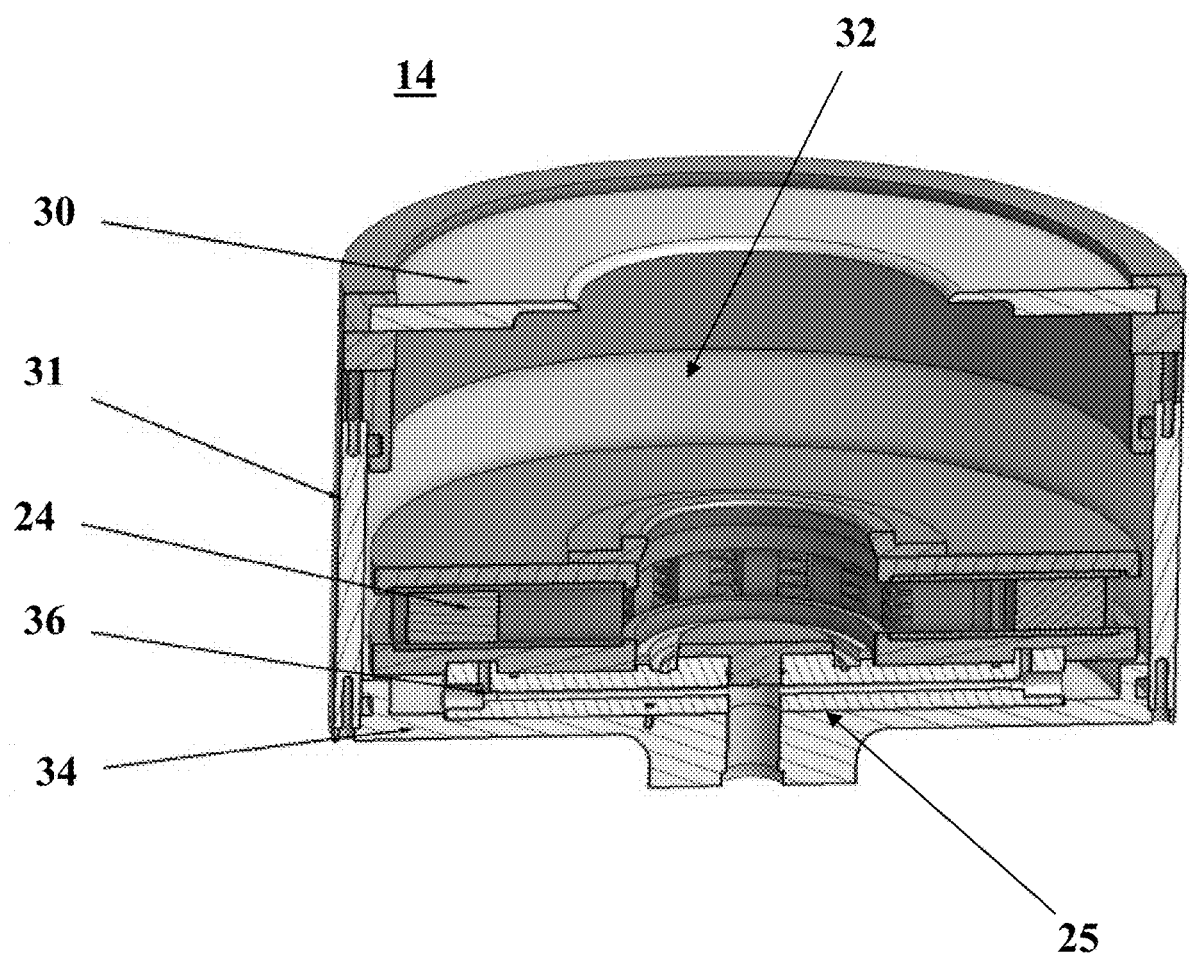
FIG. 3 is a cross-sectional view of the drum section of the compressor assembly of FIG. 2 and further illustrating gas and liquid process flow.

The inside of the compressor drum 14 is further illustrated in FIG. 3. As noted, the first end of the compressor drum 14 may include a compressor drum lid 30 that includes an opening for the ducted spacer block 22. The cylindrical outer side portion of the compressor drum 14 may be formed by the rotating housing 31, which may form an open central area 32 having a first end at the compressor drum lid 30. The compression channel assembly 24, which is more fully described below, may sit at the second opposite end of the open central area 32 from the compressor drum lid 30. A drum plate 34 may form the second opposite end of the compressor drum 14. Between the compression channel assembly 24 and the drum plate 34 may be the gas harvest plate 25, which may include gas harvest passage 36, as further explained below. In an embodiment with no ducted spacer block 22, the compressor drum 14 may have a more compact design.

Figure 4:
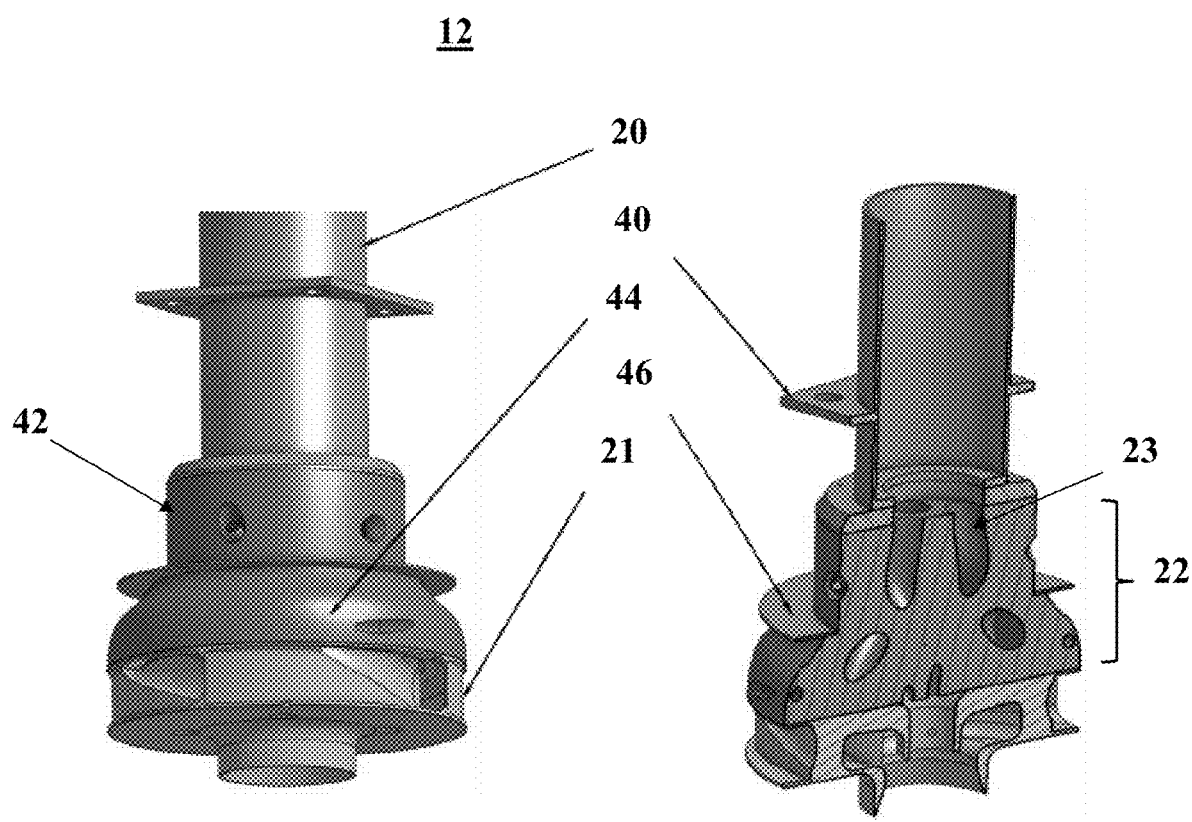
FIG. 4 is a perspective view and a cross-sectional view of a static vane return assembly of the drum section of FIG. 3.

FIG. 4 further illustrates the SVR assembly 12. The SVR assembly 12 may be a static or non-rotating device that may be used to return (i.e., recycle) fluid from the outer side portion of the compressor drum 14 to the center of the compressor drum 14. The SVR assembly may also draw gas into the compressor 10 and may pre-pressurize that gas before being further compressed within the compression channel assembly 24. The SVR assembly 12 may also balance gas and fluid levels within the compressor 10, adding or removing gas and fluid to and from a common pressure zone as needed, as further described herein. As shown in FIG. 4, the mounting column 20 may be circumscribed by a mounting flange 40 that may be affixed to the cage assembly 16, as shown in FIG. 1. The ducted spacer block 22 may have a first portion 42 that includes one or more ducts 23, a second opposite portion 44, and a seal plate 46.

During operation, fluid fills the gap between the seal plate 46 and the compressor drum lid 30 to form a water seal. As the annular lake level increases, the lake essentially acts as a p-trap that contains the pressurized gas within the compressor drum 14. As previously noted, the SVR 21, which is more fully illustrated in FIG. 5, may be affixed to the bottom of the ducted spacer block 22.

Figure 5:
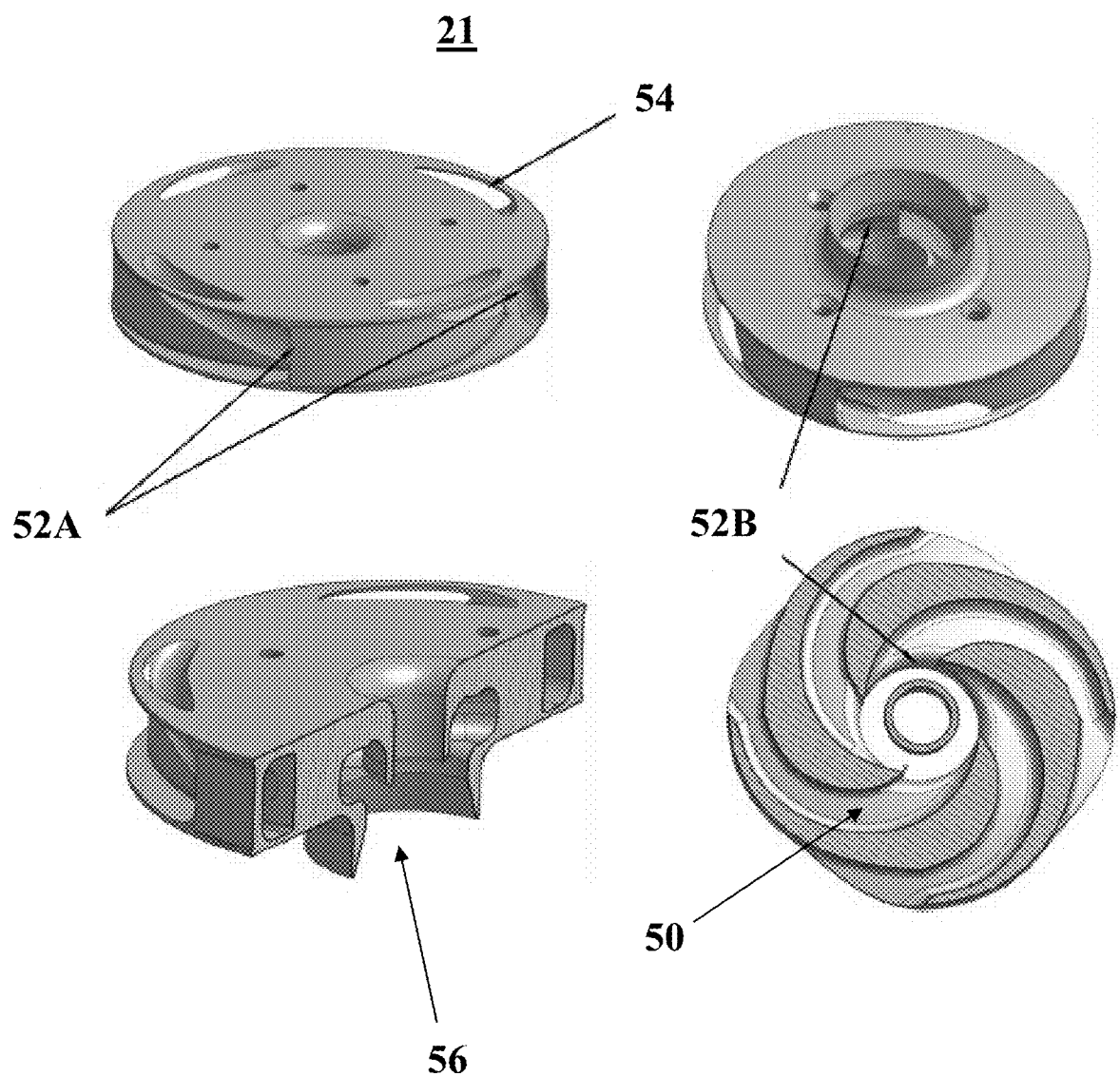
FIG. 5 includes perspective, cross-section and top view of the static vane return of the static vane return assembly of FIG. 4.

FIG. 5 provides more detailed views of the SVR 21 in accordance with an embodiment. As will be more fully explained below with reference to FIG. 7, as fluid is added to the compressor drum 14, the fluid level of the annular lake may move higher, meaning towards the center of the compressor drum 14. Eventually, the fluid level may rise to the level of the vanes 50, at which point the fluid may enter the vanes 50 at the inlet 52A. Although there are four vanes 50 shown in the embodiment, there may be less than four vanes, including a single vane if properly balanced, or more than four vanes in other embodiments. Penetrations or ducts (not shown) in the embodiment of SVR 21 shown in FIG. 5 may also be provided in an embodiment. Such penetrations or ducts may pitot ducts, liquid make up ports, a pressure relief ports as further described herein. Such penetrations or ducts in the SVR 21 may be similar to the penetrations or ducts of the ducted spacer block 22, as further described herein. As the fluid level increases within the compressor drum 14 the vanes 50 may become submerged and fluid may be drawn from the lake into the SVR 21. At the same time, pitot ducts (shown but not labeled in FIG. 4, and further described below) positioned near the vanes 50 in the SVR 21 or in a second portion 44 of the ducted spacer block 22 may allow removal of fluid from the drum, potentially to drain off excess fluid or implement a cooling system.

Fluid and possibly low-pressure gas may exit the vanes 50 at the outlets 52B. The vanes 50 may have a substantially constant cross-sectional area, although the orientation may change from vertical to horizontal from the outer circumference of the SVR 21 to the interior area of the SVR 21. For example, the vane 50 may ramp downward from the inlet 52A at the top of the SVR 21 toward the bottom of the SVR 21 but become substantially level at the outlet 52B. As a result, the fluid flow at the outlet 52B may be substantially tangentially and downward. Other shapes, orientations and arrangements of the vanes 50 are possible.

The second end of ducted spacer block 22 may be mated to the first end of SVR 21 such that the gas inlet channels 23 of the ducted spacer block 22 may be matched to the SVR gas intake ports 54 of the SVR 21. The fluid spinning in the compressor drum 14 may be traveling very fast relative to the inlet gas as the fluid enters the vane 50, which may cause the incoming gas to achieve some fraction of the fluid velocity while moving through the vanes 50. This action may serve to draw gas into the SVR inlet 52A along with the fluid and may pre-pressurize gas in the fluid as it enters a central inlet chamber 56.

FIG. 6 provides a more detailed illustration of the ducted spacer block 22 which may include a number of different penetrations, including the four gas inlet channels 23, two pitot ducts 60, a liquid make up port 62, a pressure relief port 64 and four bolt holes 66. The bolts hole 66 may pass all the way through the ducted spacer block 22 from the first end to the second end so that the ducted spacer block 22 may be sandwiched between the SVR 21 and the mounting column 20. The gas inlet channels 23 may be formed so as to allow an adequate volume of gas to pass into the compressor 10. The gas inlet channels, together with the mounting column 20 may make it possible to plumb the compressor 10 directly from a gas source, to allow the compressor to operate in an ambient atmosphere, and to allow the compressor to be fed with gas from another source. As noted above, the pitot ducts 60 may make it possible to remove fluid once their inlets are partially or fully submerged.

Figure 7:
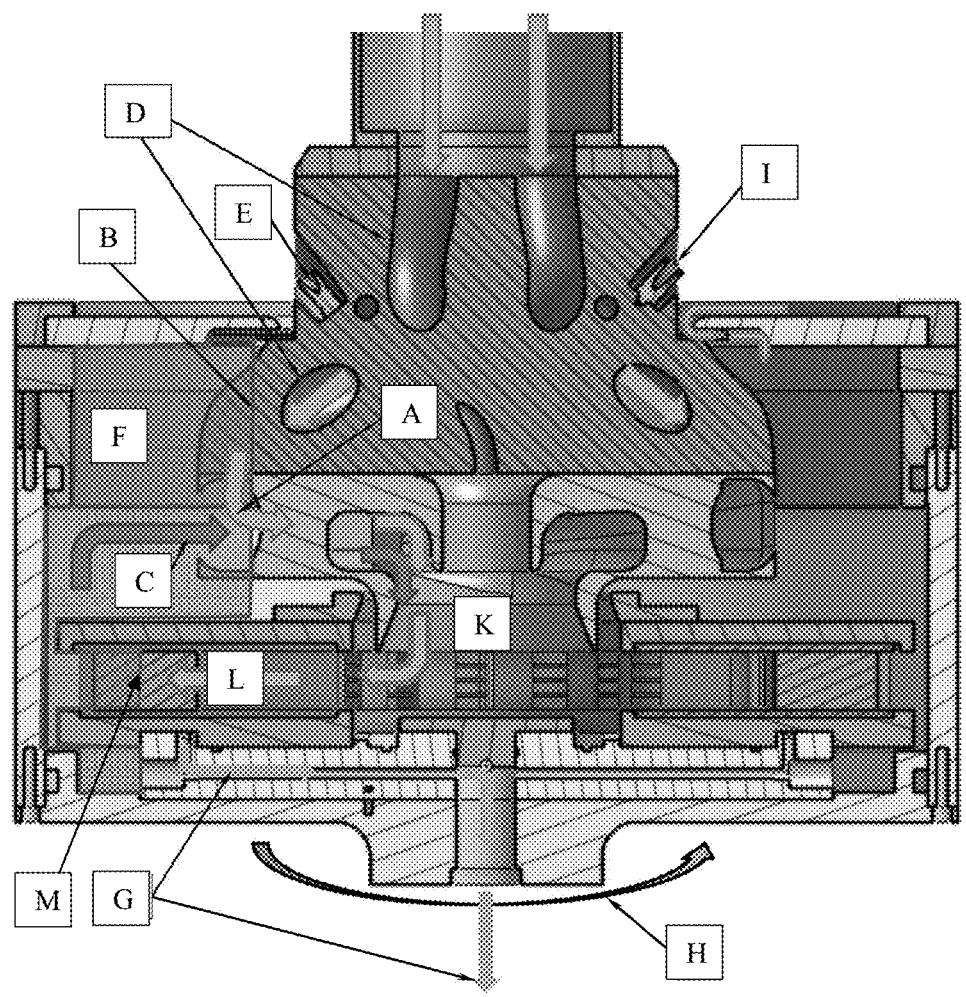
FIG. 7 is a cross-sectional view of the drum assembly of the compressor assembly of FIG. 2.

Turning now to FIG. 7, the operation of the compressor 10 may be explained. Once the compressor drum 14 has been roughly half filled with fluid, the shaft may be rotated in the direction of rotation (H). Such rotation of the compressor drum may cause the fluid to be forced against the interior wall of the rotating housing 31 (as shown in FIG. 3) by centrifugal force (F). As the fluid is spun against the interior wall of the rotating housing 31, the level (B) of the fluid may be perpendicular to the direction of rotation (H). The level (B) may be adjusted by adding fluid through the liquid make up port 62 at (I) or by removing fluid with the pitot ducts 60, as further illustrated in FIG. 6.

When the level (B) of the fluid has reached the edge of the SVR 21, a portion of the fluid (C) may be diverted into the vanes 50 of the SVR 21 and may be forced into the central inlet chamber 56 (K). If the fluid is just liquid or a combination of liquid and gas, the rotation of the drum and the resulting velocity of the liquid/fluid (C) relative to the gas (A) may result in low pressure gas being drawn into compressor 10, such as between the top of the compressor drum 14 and the ducted spacer block 22 and/or through the gas inlet channels 23 (D), and into the central inlet chamber 56 (K) along with the liquid/fluid (C). Pulling the low pressure gas (A) into the compressor with the high velocity liquid/fluid (C) may pre-pressurize the gas in the central inlet chamber 56 (K) upstream of the compression channels of the compression channel assembly 24. If pressure in the central inlet chamber 56 (K) exceeds a threshold, pressure may be released through the pressure release port 64 (E). Although reference is made to the central inlet chamber (K) being a central opening formed in the SVR 21, the central inlet chamber (K) includes the joining of the openings formed in the middle of the compression channel assembly 24 and the top of the gas harvest plate 25, as more clearly illustrated in FIGS. 3 and 7.

From the central inlet chamber (K), fluid may be forced through the inlets of the compressions channels (L) of the rotating compression channel assembly 24 by mixing and centrifugal force (F) on the fluid portion of the resulting emulsion. As further explained below, the gas in the liquid/gas fluid emulsion may be compressed within the compression channel assembly 24. As the fluid emulsion may leave the outlets of the compression channels (L) the compressed gas (G) and the liquid (C) may immediately separate due to their differing densities. The liquid (C) may return to the annular lake in the compression drum, thereby returning rotational energy in the liquid back to the compressor. The compressed gas (G) may be captured and diverted off as further explained with reference to FIG. 8.

Figure 8:
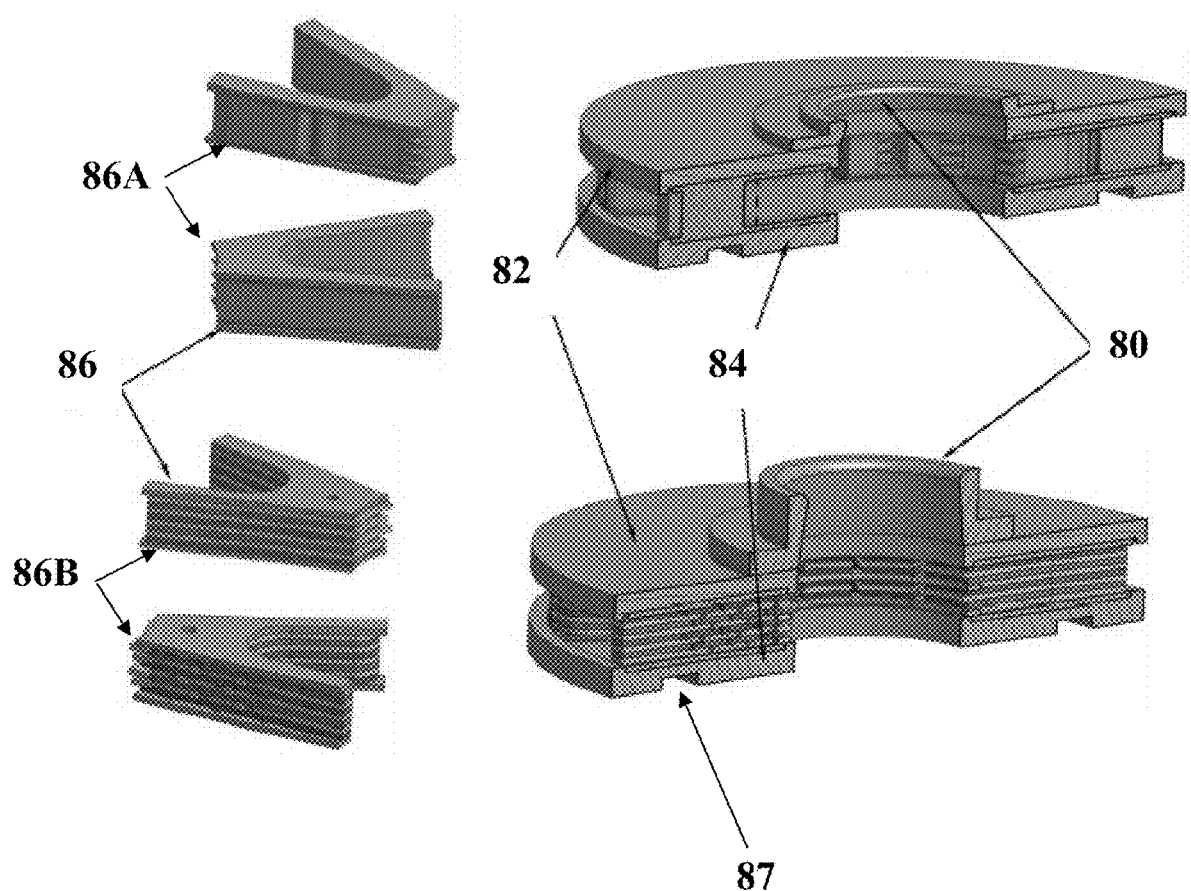
FIG. 8 includes cross-sectional views of portions of the V-block plate of the compressor assembly of FIG. 2.

The compression channel assembly 24, illustrated by the various images in FIG. 8, may utilize a plurality of radially arranged channels with rectangular cross-sections and agitators, rather than capillary tubes or other forms of tubes. The channel architecture may allow for a higher gas flow, while requiring less energy in comparison to prior designs. The compression channel assembly 24 may include a collar 80, a top plate 82, a bottom plate, 84, and a plurality of V-shaped blocks 86. The collar 80 may act as a duct for the incoming fluid and a spacer down to the top of the plate, but may be shortened if a larger (i.e., thicker) plate was desired for greater capacity.

The top plate 82 may act as a pressure plate for trapping the pressurized gas as it separates from the liquid at the outlets of the compression channels. The bottom plate 84 may act as a pressure plate and a gas harvest porting system to the gas harvest plate 25 mounted below. The V-shaped blocks 86 are illustrated in two different embodiments. The V-shaped blocks 86A may be formed of a single manufactured block, such as by machining, casting, molding or even printing. The V-shaped block 86B may be formed from a series of plates with various cross-sections stacked up to create the block assembly. One side of each V-shaped block may be smooth while the other side may include various geometric surface features that may increase gas entrainment (i.e., the separation of gas bubbles between blocks of fluid which serves to compress the gas as the liquid is forced outward by the centrifugal force (F)) and liquid friction within the channels. Both sides of the V-shaped blocks may be textured or geometrically surfaced. The underside of the bottom plate 84 may include a groove 87 further explained below.

Figure 9:
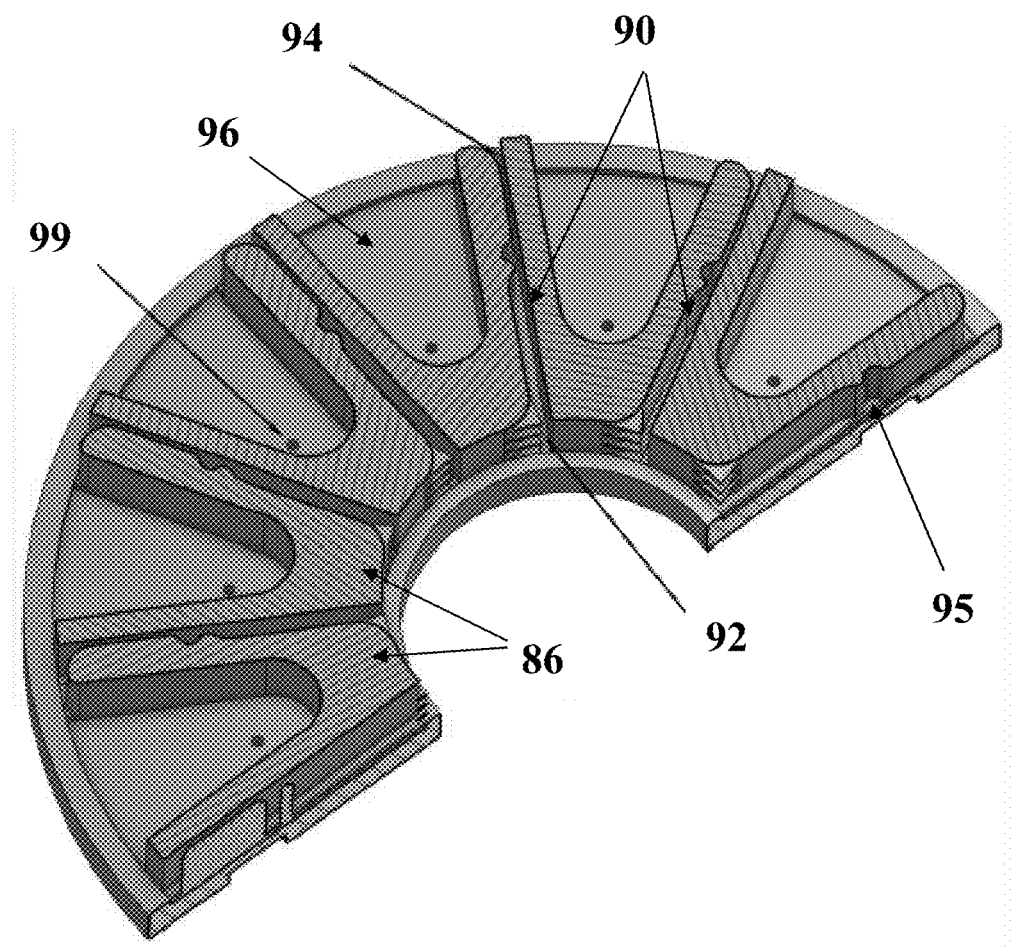
FIG. 9 is a top perspective, cross-sectional view of a portion of the V-block plate of FIG. 8.

As more fully explained with reference to FIG. 9, the compression channels 90 are formed between each of the V-shaped blocks 86. As the emulsion of fluid in the central inlet chamber 56 enters the emulsion inlets 92, liquid in the fluid may be slammed against the trailing walls of the compression channels 90 and pushed down along the length of each compression channel 90 by rotation of the compressor drum 14. Gas in the fluid entering each compression channel 90 may be pulled downward by the rushing liquid. The two streams of liquid and gas may meet at a fluid level determined by the overall liquid column (M) (as shown in FIG. 7) in the compressor drum. The liquid column (M) may act like a waterfall where actual gas entrainment occurs. Prior to arriving at the liquid column (M), the differing densities and centrifugal forces may act to keep the gas and liquid in the fluid largely separated. A venturi-type or eductor-type inlet emulsifier (not shown) may be used to feed the compression channels 90 and may have the potential for increasing the gas/liquid ratio and thereby reduce hydrodynamic drag.

Small surface features 95 in the compression channels 90 may operate as agitators or simply add friction that may assist in the gas compression. The emulsion outlets 94 at the end of each compression channel 90, are below the level of the liquid column (M) where the waterfall exists, may be smooth and taper or narrow to increase the flow velocity as the emulsion leaves the compression channels 90. The velocity increase may aid in overcoming the bubble rise velocity (i.e., the tendency of the gas bubbles to float back up the channels 90 rather than be pushed down and compressed within the compression channels 90) and therefore help to move the gas from the compression channels 90 to the separation chambers 96 formed within the "V" of each V-shaped block. For the same intended purpose of overcoming the bubble rise velocity, the compression channels 90 may also be swept or angled backwards with respect to the rotation direction of the channel assembly 24. The leading side of each emulsion outlet 94 may have a slightly lower or filleted top that may promote gas flow from the compression channels 90 toward the corresponding separation chamber 96 before the emulsion leaves the volume between the top plate 82 and bottom plate 84. A common pressure, and therefore a common liquid column (M), should be maintained across all of the V-shaped blocks to avoid creating any imbalances in the compressor 10.

A small hole formed in the bottom plate 84 may form a separate gas harvest port 99 for each separation chamber 96. The hole may be formed at any of a number of locations. Each of the gas harvest ports 99 may communicate with a common groove 87 on the underside of the bottom plate 84. The groove 87 may align with a common groove (shown in FIG. 3) in the gas harvest plate 25. In some embodiments the bottom plate 84 and gas harvest plate 25 may be combined as a single part. During operation, pressurized gas (G) (in FIG. 7) may be captured within the separation chambers 96 and pass through the gas harvest ports 99 into the common grooves formed between the bottom plate 84 and the gas harvest plate 25. The pressurized gas (G) may then move into an opening (shown in FIGS. 2, 3 and 7) in the lower shaft 26, through the lower shaft 26, and out of the compressor 10 through the gas harvest nipple or valve 28.

In an embodiment, the gas compressor may comprise a substantially hollow cylindrical drum having a first end and a second end opposite the first end. The second end may be affixed to a shaft configured to rotate the drum. The drum may include a compression channel assembly defining a plurality of compression channels, each compression channel extending from an opening at a common pressure zone toward an interior surface of the drum distal to an axis of rotation. The compressor may also include a static vane return positioned adjacent the compression channel assembly and having an outlet to the common pressure zone. The static vane return may be configured not to rotate with the drum.

The static vane return may include at least one vane extending from an inlet at an outer circumference of the static vane return to the common pressure zone. The compressor may further include a ducted spacer block positioned adjacent the static vane return and one or more channels into or returning from the static vane return. The ducted spacer block may be configured not to rotate with the drum. Rotation of the drum may cause a fluid inside the drum to form an annular lake having a fluid level. When the fluid level reaches the inlet of the at least one vane, fluid may be drawn from the annular lake through the at least one vane and into the common pressure zone, where the fluid may be forced into the opening of each compression channel. Gas in the fluid within each compression channel may be compressed as it travels from the common pressure zone toward the interior surface. The pressurized gas may be separated from liquid in the fluid prior to leaving the compression channel assembly while the liquid is returned to the annular lake.

In the embodiment, wherein the compressor further includes a pressurized gas harvesting system that may be configured to separate the pressurized gas from the liquid. The pressurized gas harvesting system may include a plate adjacent the compression channel assembly, the plate may include passages formed therein and may be configured to receive the pressurized gas from the compression channel assembly. A first end of the passages of the plate may align with openings formed in the compression channel assembly and a second opposite end of the passages may connect to a gas harvest valve.

In the embodiment, wherein the compression channel assembly may include a plurality of V-shaped blocks positioned to form each compression channel between adjacent V-shaped blocks, a single manufactured part may comprise several V-blocks. The compression channel assembly may include a first plate on a first side of the plurality of V-shaped blocks and a second plate on a second opposite side of the plurality of V-shaped blocks and pressure across each compression channel of the plurality of compression channels may be balanced.

In the embodiment, wherein the V-shaped blocks may be formed from a single block shaped to form a first wall of a first adjacent compression channel and to form a second wall of a second adjacent compression channel. The first wall may include at least one of a smooth surface or a geometric feature surface and the second wall includes at least one of a smooth surface or a geometric feature surface. The V-shaped blocks may be one or more of machined, casted, molded and printed.

In the embodiment, wherein the V-shaped blocks may be formed from a series of plates stacked to form a first wall of a first adjacent compression channel and to form a second wall of a second adjacent compression channel. The first wall may include at least one of a smooth surface or a geometric feature surface and the second wall may include at least one of a smooth surface or a geometric feature surface. The series of plates may have different cross-sections so as to form one or more of a first wall and a second wall having a geometric feature surface.

In the embodiment, wherein at least one vane may have a substantially constant cross-sectional area from the outer circumference to the common pressure zone. Wherein the at least one vane may have a variable cross-section area from the outer circumference to the common pressure zone.

In the embodiment, wherein the static vane return may further form at least one gas intake port configured to direct gas to the at least one vane.

In the embodiment, wherein the static vane return assembly may include at least one pitot duct configured to adjust the fluid level of the annular lake, and/or allow the implementation of a cooling system by removing liquid. Wherein the static vane return assembly may include at least one fluid make up port configured to adjust the fluid level of the annular lake, and/or allow the implementation of a cooling system by adding fluid. Wherein the static vane return assembly may include at least one pressure relief port configured to adjust pressure within the common pressure zone.

In the embodiment, wherein the compressor further includes a mounting column adjacent to the static vane return assembly that may be configured to direct gas into the static vane return assembly.

While the present disclosure has been illustrated and described herein in terms of several alternatives, it is to be understood that the techniques described herein can have a multitude of additional uses and applications. Accordingly, the disclosure should not be limited to just the particular description, embodiments and various drawing figures contained in this specification that merely illustrate one or more embodiments, alternatives and application of the principles of the disclosure.

What is claimed:

1. A gas compressor, comprising:
   a substantially hollow cylindrical drum having a first end and a second end opposite the first end, the second end affixed to a shaft configured to rotate the drum, the drum including a compression channel assembly defining a plurality of compression channels, each compression channel extending from an opening at a common pressure zone toward an interior surface of the drum distal to an axis of rotation, the drum being configured to draw gas external to the drum into the common pressure zone; and
   a static vane return assembly positioned adjacent the compression channel assembly and having an outlet to the common pressure zone, wherein the static vane return assembly is configured not to rotate with the drum, the static vane return assembly including at least one vane extending from an inlet at an outer circumference of the static vane return to the common pressure zone through which at least fluid is channeled to the common pressure zone,
   wherein rotation of the drum causes a fluid inside the drum to form an annular lake having a fluid level, wherein when the fluid level reaches the inlet of the at least one vane, fluid is drawn from the annular lake through the at least one vane and into the common pressure zone where the fluid is forced into the opening of each compression channel, wherein gas in the fluid within each compression channel is compressed as it travels from the common pressure zone toward the interior surface, wherein the pressurized gas is separated from liquid in the fluid prior to leaving the compression channel assembly, and wherein the liquid is returned to the annular lake.

2. The gas compressor of claim 1, further comprising a pressurized gas harvesting system configured to separate the pressurized gas from the liquid.

3. The gas compressor of claim 2, wherein the pressurized gas harvesting system includes a plate adjacent the compression channel assembly, the plate including passages formed therein and configured to receive the pressurized gas from the compression channel assembly.

4. The gas compressor of claim 3, wherein a first end of the passages of the plate align with openings formed in the compression channel assembly and a second opposite end of the passages connects to a gas harvest valve.

5. The gas compressor of claim 1, wherein the compression channel assembly includes a plurality of V-shaped blocks, wherein each V-shaped block is positioned near another V-shaped block so as to form each compression channel therebetween.

6. The gas compressor of claim 5, wherein the compression channel assembly includes a first plate on a first side of the plurality of V-shaped blocks and a second plate on a second opposite side of the plurality of V-shaped blocks, and wherein pressure across each compression channel of the plurality of compression channels is balanced.

7. The gas compressor of claim 5, wherein the plurality of V-shaped blocks are formed from a single block shaped to form a first wall of a first adjacent compression channel and to form a second wall of a second adjacent compression channel.

8. The gas compressor of claim 7, wherein the first wall includes a smooth surface and the second wall includes a geometric feature surface.

9. The gas compressor of claim 8, wherein the geometric feature surface is angled from a direction of rotation of the drum.

10. The gas compressor of claim 7, wherein the V-shaped blocks are one or more of machined, casted, molded and printed.

11. The gas compressor of claim 1, wherein the V-shaped blocks are formed from a series of plates stacked to form a first wall of a first adjacent compression channel and to form a second wall of a second adjacent compression channel.

12. The gas compressor of claim 11, wherein the first wall includes a smooth surface and the second wall includes geometric feature surface.

13. The gas compressor of claim 12, wherein the geometric feature surface is angled from a direction of rotation of the drum.

14. The gas compressor of claim 11, wherein the series of plates have different cross-sections so as to form the first wall and the second wall.

15. The gas compressor of claim 1, wherein the at least one vane has a substantially constant cross-sectional area from the outer circumference to the common pressure zone.

16. The gas compressor of claim 1, wherein the at least one vane has a variable cross-section area from the outer circumference to the common pressure zone.

17. The gas compressor of claim 1, wherein the static vane return assembly further forms at least one duct configured to direct gas to the at least one vane.

18. The gas compressor of claim 1, further comprising a gas intake duct positioned adjacent the static vane return assembly and forming at least one channel configured to direct gas into the at least one vane of the static vane return assembly, the gas intake duct being configured not to rotate with the drum.

19. The gas compressor of claim 18, wherein the gas intake duct includes at least one pitot duct configured to adjust the fluid level of the annular lake by removing fluid.

20. The gas compressor of claim 18, wherein the gas intake duct includes at least one fluid make up port configured to adjust the fluid level of the annular lake by adding fluid.

21. The gas compressor of claim 18, wherein the gas intake duct includes at least one pressure relief port configured to adjust pressure within the common pressure zone.

22. The gas compressor of claim 18, further comprising a mounting column adjacent to the gas intake duct and configured to direct gas into the gas intake duct.

23. The gas compressor of claim 1, further comprising a gas intake duct positioned adjacent the static vane return assembly and configured to direct gas directly into the common pressure zone, the gas intake duct being further configured not to rotate with the drum.

24. The gas compressor of claim 23, wherein the gas intake duct includes at least one fluid make up port configured to adjust the fluid level of the annular lake by adding fluid.

25. The gas compressor of claim 23, wherein the gas intake duct includes at least one pressure relief port configured to adjust pressure within the common pressure zone.

26. The gas compressor of claim 23, further comprising a mounting column adjacent to the gas intake duct and configured to direct gas into the gas intake duct.

27. The gas compressor of claim 1, the static vane return assembly further including at least one duct configured to allow one or more of gas and fluid to be added to and removed from the common pressure zone.

* * * * *